Patented Nov. 25, 1947

2,431,487

UNITED STATES PATENT OFFICE 2,431,487

OIL DETECTION IN DRILLING MUDS

Delmar H. Larsen, Los Angeles, Calif., assignor to National Lead Company, Los Angeles, Calif., a corporation of New Jersey No Drawing. Application June 22, 1942, Serial No. 448,031

13 Claims. (Cl. 250—71)

This invention relates to an improved method of detecting the minute amounts of oil dilutedly dispersed in the drilling mud as it emerges from a well which is being drilled for oil.

A method of logging wells during the drilling thereof by analysis of the rotary drilling mud emerging from the well for traces of oil, dilutedly dispersed therein from the core drilled out by the bit, is described in Hayward Patent No. 2,214,674. One of the methods described depends on fluorescence analysis of mud returns by ultraviolet light; see also Hayward Patent No. 2,213,138. The method of detecting oil by fluorescence analysis is to shine ultraviolet light either on the mud itself, or on the mud after dilution with water with or without the further addition of a deflocculating agent, such as sodium pyrophosphate. This method is practical only where the droplets of oil are rather large, of the order of magnitude of 0.1 millimeter or more. Smaller droplets neither give enough fluorescent light when irradiated to be seen except possibly with highly refined and expensive fluorescence microscopes, nor are they capable of rising to the surface of the thin mud in any reasonable time. For example, a small amount of crude oil put into the average drilling mud and whipped up in a mixer of the soda fountain type for a few minutes giving agitation at least equal to that which takes place under conditions of flow in an actual oil well, usually results in dispersion of the oil into particles smaller than 10 microns in diameter. For very small concentrations of oil, it is impossible by using any of the fluorescence methods described in the prior art to obtain a positive indication of oil.

One of the objects of the present invention is to provide a method of obtaining a positive indication of minute amounts of crude oil in drilling mud in spite of extremely great dispersion of the oil therein.

Another object of the invention is to provide a method for making the determination of oil in drilling mud absolutely quantitative, at least for a given type of oil, in spite of varying degrees of dispersion of oil in the mud and in spite of varying physical characteristics of the mud.

Another object of the invention is to provide a method for enhancing to the greatest degree the fluorescence obtainable from a given amount of oil when diluted in dispersion in a drilling mud.

Further objects will appear from the detailed description, in which will be set forth illustrative embodiments; it will, however, be understood that this invention is susceptible of various embodiments within the scope of the appended claims.

According to the present invention, a mud containing minute concentrations of crude oil dispersed therein is mixed with a quantity of a liquid which is a mutual solvent for oil and water; the mud so treated is then subjected to an analysis for oil, as by fluorescence excitation. Among such mutual solvents may be mentioned ketones such as acetone, methyl ethyl ketone, and diethyl ketone, alcohols such as methanol, ethanol, propanol, isopropanol, butanol, isobutanol, normal, iso, and tertiary amyl alcohols, and hexyl alcohols, dioxane, compounds such as diethylene glycol, ethyl cellosolve (ethylene glycol monoethyl ether), butyl cellosolve (ethylene glycol mono-butyl ether), and the like. All of these solvents are characterized by the fact that they are miscible or nearly so with water, and at the same time are capable of dissolving appreciable amounts of hydrocarbons such as comprise crude oils. It is contemplated that not only the single solvents themselves, but also mixtures thereof may be used.

This process is distinguished from a method of mixing the mud with completely hydrophilic and oleophobic substances such as water on the one hand, and with completely oleophilic and hydrophobic substances such as petroleum naphtha, benzol and its homologues, carbon tetrachloride, tetrachlorethane, ethyl ether and the like on the other hand.

When a hydrophilic substance such as water is used for diluting a mud containing oil droplets there is no particular tendency to break the emulsion; the individual droplets of oil merely become more greatly separated by intervening water. The total amount of fluorescence which can be produced from a system is thereby not increased, except insofar as the masking effects of mud solids may be reduced. The principal difficulty in observing fluorescence in undiluted oil, such as is the case when the droplets themselves are observed, is that the oil is so concentrated that it masks its own fluorescence, and the only fluorescent light which reaches the eye is that which emitted from the surface of the droplets, the interior of the droplets not contributing any fluorescence at all. Diluting with water, therefore, is only a makeshift, and while it helps in allowing large droplets to float to the surface where they may be more readily seen and be enabled to collect into large droplets, it still is not a solution of the problem solved by this invention, namely, that of detecting extremely small droplets, which will not rise to the surface in any reasonable length of time in spite of dilution with water and the use of deflocculating agents.

When non-polar solvents which are immiscible with water, such as benzol, petroleum naphtha, carbon tetrachloride, carbon disulphide, and the like are used, the difficulty is that the minute oil droplets never get a chance to merge with the organic solvent phase since they are completely immersed in an aqueous phase which is not miscible with the solvent. In other words, if a volume of mud containing dispersed minute oil droplets is shaken with an equal volume of a hydrophobic solvent, such as carbon tetrachloride, only those droplets which happen to find themselves at the interface carbon tetrachloride-water will dissolve in the carbon tetrachloride. By extreme agitation continued over very long periods of time, it would theoretically be possible to get all of the oil droplets to become dissolved in the carbon tetrachloride phase, but this is impractical for rapid and routine analyses, such as would be the principal field of application of the present invention.

The use of a mutual solvent for oil and water in accordance with this invention for mixing with the drilling mud containing dispersed oil avoids both of the foregoing difficulties. As the solvent is added to the drilling mud it mixes with it completely, forming a single phase with it and not an additional phase such as is the case with non-polar solvents. Each oil droplet, no matter how small it is is thus immediately and completely surrounded by a medium in which it is at least partially soluble. Whatever characteristics the oil has by means of which it can be detected such as the ability to fluoresce, is thus immediately imparted to the whole mass of drilling mud. In fact, when the invention is carried out on an actual sample of drilling mud contaminated with a minute amount of oil the effect is spectacular when the mixture of mutual solvent and drilling mud is examined under ultraviolet light.

It is well known that the more concentrated a fluorescent material contained in a solvent is, the less is the yield of fluorescent light per unit weight of fluorescing substance. The practice of this invention results in as dilute a solution of the oil as desired, and thus enables the fluorescing ability of the oil to be realized to the maximum. The fluorescence can be even more sharply defined by separating the solvent solute from the mud, as by centrifuging the mixture of mud and mutual solvent so that an absolutely clear, fluorescing solution is obtained.

It is not necessary that the particular crude oil contained in the mud be completely soluble in the particular solvent used. For example, when a test was made with crude oil from Kettleman Hills, California, it was found that this crude oil was only feebly soluble in acetone, ethyl alcohol, methyl alcohol, and diethylene glycol, although some constituents of this crude oil dissolve out into the solvent. When these solvents were separately added to equal volumes of drilling mud containing a trace of Kettleman Hills crude oil, the mixture exhibited substantially as great fluorescence as was obtained when mutual solvents of greater solvent action on the crude oil, such as dioxane and butyl alcohol, were used. No fluorescence at all, however, was imparted to water, carbon tetrachloride, or benzol shaken with this mud.

It is intended that not only fluorescence analysis be used on the solution of crude oil in the mixture of mutual solvent and drilling mud liquid, but also any other methods of selective visual inspection and other methods of detecting dissolved crude oil which may be applicable to the particular crude oil and to the particular solvent used. For example, the Raman effect, infrared absorption analysis; spectrophotometric analysis of the clarified supernatant liquid using a wave length selectively absorbed by the particular crude oil found in the field where the well is drilled; excitation by diffused light, and other methods of analysis may be used. The use of this invention enables all of the oil contained in a given sample of drilling mud to be instantaneously uniformly dissolved into a known volume of mutual solvent-water mixture, so that it is available for analysis by any of the foregoing methods, a condition which is not the case if the mud is mixed either with water or with a non-mutual solvent such as carbon tetrachloride.

Particularly in the case of fluorescence analysis, it will be found worth while to determine fluorescence quantitatively by carrying out the dilution of the sample of mud with solvent to such an extent that concentration quenching no longer takes place. By "concentration quenching" is meant the reduction in fluorescence when the fluorescing substance exceeds a certain concentration in solution. In very dilute solutions of a fluorescing substance, the amount of fluorescence for a given irradiation is proportional to the concentration of the substance; but at higher concentrations the fluorescence yield diminishes, so that the amount of fluorescence is less than would be expected from the concentration of the substance present. Accordingly, at sufficiently dilute concentrations, the fluorescence yield is not diminished, and concentration quenching ceases. Upon irradiation of an aliquot portion of the clarified liquid so obtained with ultraviolet light, the resulting fluorescent light, preferably filtered through for example an aesculin filter to remove all traces of ultraviolet light, may be quantitatively measured with a photometer. In order to attain such result, the solvent may be added to the mud or to the solvent and solute separated from the mud; in both cases to an extent that concentration quenching no longer takes place.

This invention has another great advantage in that it enables fluorescent spectrography to be applied to the detection of oil. While the light irradiated by droplets of oil in drilling mud excited to fluorescence may be passed through a spectroscope with the view of distinguishing lines or sharp bands which would be characteristic for the particular oil; when this is done it is found that because of the high degree of concentration of the oil in a droplet the light consists of more or less continuous bands over a range of colors; the effect is similar to the broadening of spectral lines of gases at high pressures, or liquids, or solids. However, when the oil droplets are caused to become dissolved in a mixture of mud and mutual solvent, and the supernatant liquid then irradiated with ultraviolet light the fluorescing substance, namely, oil is diluted sufficiently that the fluorescence bands are very much sharpened so that it is possible to distinguish between different oils, and in certain cases between crude oils encountered during drilling and grease used in the drilling operations.

The presence of greases in the drilling mud usually has given rise to great confusion in the past when an attempt was made to detect crude oil in the same mud by fluorescence analysis, as most greases fluoresce readily. There are several means in accordance with this invention which can be applied to make such a distinguishing between greases and oils practical. As the invention is ordinarily practiced when greases are present, the mixture of mutual solvent and drilling mud ordinarily contains not more than 50% by volume of mutual solvent. Such a relatively water-rich solution, while it will dissolve minute droplets of crude oil readily, leaches the oil out of greases much more slowly, so that if the fluorescence determinations are made within a reasonably short time after mixing the solvent with the mud, the greases will not contribute to the fluorescence of the solutions. If it is desired to subject the solution to extended analysis, such as fluorescence spectrography, centrifuging the mixture of drilling mud and solvent will quickly remove the grease from the bulk of the supernatant liquid, a portion of which can then be pipetted off and saved for further analysis. Another precaution which could be taken is to chill both the drilling mud and the solvent before mixing so that the final mixture of drilling mud and solvent is close to the freezing point of water. This will cause the specks of grease to harden and will greatly decrease the rate of solution of the oil from the greases into the mud, while the crude oil droplets will go into solution nearly as readily as ordinary temperatures. As the heat of solution of most of the mutual solvents used herein with water is positive, the solvent can even be chilled below the freezing point of water.

It will be found advantageous in a general case to dilute the mud somewhat with water before adding solvent or what amounts to the same thing, add not the pure solvent but a mixture of solvent and distilled water. The object of doing this is to keep the concentration of clay solids rather low, as the addition of most of the solvents used flocculates the clay, which in the case of some drilling muds creates a stiff gel which does not settle out very readily, and makes thorough mixing of the solvent with the drilling mud a laborious operation.

Having thus described the invention, what is claimed is:

1. The method of detecting oil in drilling mud, comprising, treating the mud with a mutual solvent for oil and water and subjecting the treated mud to analysis for oil.

2. The method of detecting oil in drilling mud, comprising, treating the mud with a mutual solvent for oil and water, separating the solvent and its solute from the remainder of the mud and subjecting the solvent and solute to analysis for oil.

3. The method of detecting oil in drilling mud, comprising, treating the mud with a mutual solvent for oil and water and subjecting the treated mud to selective visual inspection for oil.

4. The method of detecting oil in drilling mud, comprising, treating the mud with a mutual solvent for oil and water, separating the solvent and its solute from the remainder of the mud and subjecting the solvent and solute to selective visual inspection for oil.

5. The method of detecting oil in drilling mud, comprising, treating the mud with a mutual solvent for oil and water and subjecting the treated mud to fluorescence excitation.

6. The method of detecting oil in drilling mud, comprising, treating the mud with a mutual solvent for oil and water, separating the solvent and its solute from the remainder of the mud and subjecting the solvent and solute to fluorescence excitation.

7. The method of detecting oil in drilling mud, comprising, treating the mud with a mutual solvent for oil and water until concentration quenching ceases and subjecting the solvent and solute to fluorescence excitation.

8. The method of detecting oil in drilling mud, comprising, treating the mud with a mutual solvent for oil and water, separating the solvent and its solute from the remainder of the mud, treating the solvent and solute with additional of such solvent until concentration quenching ceases and subjecting the solvent and solute to fluorescence excitation.

9. The method of detecting oil in drilling mud, comprising treating diluted mud with a mutual solvent for oil and water and subjecting the treated mud to analysis for oil.

10. The method of detecting oil in drilling mud, diluting the mud with water and treating the diluted mud with a mutual solvent for oil and water and subjecting the treated mud to analysis for oil.

11. The method of detecting oil in drilling mud, comprising, treating the mud with a mutual solvent for oil and water and subjecting the treated mud to spectroscope analysis.

12. The method of detecting oil in drilling mud, comprising, treating the mud with a mutual solvent for oil and water and subjecting the treated mud to analysis by fluorescent spectrography.

13. The method of detecting oil in drilling mud, containing also a grease, comprising, treating the mud with a mutual solvent for oil and water and subjecting the treated mud to spectroscope analysis for oil as distinguished from grease.

DELMAR H. LARSEN.

REFERENCES CITED

The following references are of record in the file of this patent:

UNITED STATES PATENTS

| Number | Name | Date |
| --- | --- | --- |
| 2,133,280 | Burk | Oct. 18, 1938 |
| 2,173,842 | Horner | Sept. 26, 1939 |
| 2,206,922 | Smith | July 9, 1940 |
| 2,213,138 | Hayward | Aug. 27, 1940 |
| 2,263,108 | Stuart | Nov. 18, 1941 |
| 2,288,942 | Doan | July 7, 1942 |
| 2,297,939 | Campbell | Oct. 6, 1942 |